United States Patent
Son et al.

(10) Patent No.: US 6,603,504 B1
(45) Date of Patent: Aug. 5, 2003

(54) MULTIVIEW THREE-DIMENSIONAL IMAGE DISPLAY DEVICE

(75) Inventors: Jung Young Son, Sungnam-shi (KR); Vadim V. Smirnov, Saint-Petersburg (RU); Hyung Wook Jeon, Seoul (KR); Yong Jin Choi, Seoul (KR); Hyuck Su Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/317,630

(22) Filed: May 25, 1999

(51) Int. Cl.$^7$ .......................... H04N 13/04; H04N 15/00
(52) U.S. Cl. ........................................................ 348/54
(58) Field of Search ................... 345/419, 112, 345/32, 151; 359/462, 478; 348/51, 52, 53, 54, 55, 56, 57, 58, 59; H04N 13/04, 15/00

(56) References Cited

U.S. PATENT DOCUMENTS

| | | | | |
|---|---|---|---|---|
| 5,101,279 A | * | 3/1992 | Kurematsu et al. | 348/781 |
| 5,537,144 A | * | 7/1996 | Faris | 348/54 |
| 5,696,552 A | * | 12/1997 | Aritake et al. | 348/40 |
| 5,731,853 A | * | 3/1998 | Taketomi et al. | 349/15 |
| 6,064,424 A | * | 5/2000 | van Berkel et al. | 348/42 |
| 6,069,650 A | * | 5/2000 | Battersby | 345/6 |

FOREIGN PATENT DOCUMENTS

| | | | | |
|---|---|---|---|---|
| EP | 0 625 861 A2 | * | 11/1994 | H04N/13/04 |
| EP | 0 724 176 | | 7/1996 | |
| GB | 2196166 A | * | 4/1988 | G09F/9/00 |
| JP | 8-186849 | | 7/1996 | |
| JP | 8-248355 | | 9/1996 | |
| JP | 8-307907 | | 11/1996 | |

OTHER PUBLICATIONS

A. R. L. Travis, et al., Journal of the SID, vol. 3/4, pp. 203–205, "Time–Multiplexed Three–Dimensional Video Display", 1995.

J.–Y. Son, et al., SPIE, vol. 3295, pp. 218–223, "A Multiview 3–D Imaging System With Full Color Capabilities", 1998.

R. Börner, Fernseh–Und Kino–Technik, vol. 48, pp. 594–600, "Autostereoskopische Rückprojektions–Und Flachbildschirme", 1994.

J. B. Eichenlaub, SPIE, vol. 1256, pp. 156–163, "An Autostereoscopic Display for use With a Person Computer", 1990.

* cited by examiner

Primary Examiner—Nhon Diep
(74) Attorney, Agent, or Firm—Oblon, Spivak, McClelland, Maier & Neustadt, P.C.

(57) ABSTRACT

The present invention discloses a multiview 3D image display device which decreases the size of system and has a high resolution of images, and which can thus improve the quality of images.

The image display system comprises an image display element for alternately displaying respective images corresponding to the respective left and right eyes of one person on the column pixel lines thereon; two illuminating means disposed at the rear of the image display element for providing respective polarized lights onto the image display element, the respective polarized lights having polarizing directions different from each other by 90 degrees; and a polarizing filter disposed between the image display element and the illuminating means for separating the polarized lights from the illuminating means into respective polarized lights corresponding to the respective column pixel lines of the image display element, the respective polarized lights being illuminated onto the respective column pixel lines through the polarizing filter; wherein viewing zones corresponding to the left and right eyes are formed at the front of the image display element by the polarized lights having the different polarizing directions.

8 Claims, 15 Drawing Sheets

Sub-zone forming order by the liquid crystal shutter switching

Incident and polrizing directions

MULTIVIEW THREE-DIMENSIONAL IMAGE DISPLAY DEVICE

BACKGROUND OF THE INVENTION

1. Field of the Invention

The present invention relates to multiview three-dimensional image display devices, and more particularly to multiview three-dimensional image display devices using polarizing filters and light strips.

2. Description of the Related Art

Conventional glasses-free type three-dimensional image display devices are generally classified into projection type devices and contact type devices. The projection type devices is perform a multiview image display by using a time multiplexing type Fresnel lens (See "Time-Multiplexed Three-Dimensional Video Display" by A. R. Travis et. al., J. SID, V3, pp 203–205, 1995), a holographic screen (See "A Multiview three-dimensional Imaging Systems with Full Color Capabilities" by Jung-Young Son et. al., SPIE V3295), etc. The contact type devices perform a multiview image display by using a spatial multiplexing type lenticular plate (See "Autostereoskopische Ruckprojections-und Flachbildschirme" by R. Borner, FKT, V48, pp. 594–600, 1994), a parallax barrier plate (See "Autostereoscopic Three-dimensional Display Using LCD Generated Parallax Barrier" by H. Isono et. al., 12th Int. Display Research Conference, Japan, Display '92, pp. 303–306, 1992), a slit type light source (See "An Autostereoscopic Display for Use with a Personal Computer, Proc. SPIE, V1256, pp. 156–163, 1990), etc., together with an eye tracking function. The devices have their respective advantages and disadvantages, but all of the devices have difficulties in multiviewing of the display.

Since the projection type devices project CRT display images through liquid crystal shutters separated from one another in the form of strips by the number of multiview images, a viewing zone is formed in a certain region at the front of the device, and thus, the optical gain of the devices are high and the images can be magnified. However, the size of the device is increased, and a projection lens of a large aperture diameter must be used in order to expand the viewing zone.

On the other hand, the contact type device has an advantage that the size thereof is decreased. However, the viewing zones corresponding to the right and left eyes are periodically distributed at the front of the image display element and the brightness and size thereof decrease with a distance from the center of the device. Therefore, the light gain of the device becomes low. Further, if the screen of the device is small, multiviewing is difficult and the expansion of the screen is impossible. If the size of the screen is increased, the image quality of the device is lowered. Moreover, the resolution of images from the respective viewpoints is lower than a half of the number of pixels in the device.

SUMMARY OF THE INVENTION

Therefore, the object of the present invention is to provide a multiview 3D image display device which decreases the size of system and has a high resolution of images, and which can thus improve the quality of images.

The other object of the present invention is to provide a multiview 3D image display device through which a plurality of users can view multiview 3D images.

In order to achieve the object of the present invention, the image display system comprises an image display element for alternately displaying respective images corresponding to the respective left and right eyes of one person on the column pixel lines thereon; two illuminating means disposed at the rear of the image display element for providing respective polarized lights onto the image display element, the respective polarized lights having polarizing directions different from each other by 90 degrees; and a polarizing filter disposed between the image display element and the illuminating means for separating the polarized lights from the illuminating means into respective polarized lights corresponding to the respective column pixel lines of the image display element, the respective polarized lights being illuminated onto the respective column pixel lines through the polarizing filter; wherein viewing zones corresponding to the left and right eyes are formed at the front of the image display element by the polarized lights having the different polarizing directions.

The present invention is a combination of the projection type device and the contact type device. The 3D display device according to the present invention enables a plurality of users to view multiview 3D images, including stereo images, by using a polarizing plate or a strip type white light array, where the strip type polarizers having different polarization directions from one another by 90 degrees are alternately arranged in parallel with a minimum distance therebetween, and separating the respective viewpoints of multiview images alternately arranged in pixel lines on a transparent image display panel such as an LCD panel, thus defining viewing zones.

A polarizing filter is in close contact with the image display element. A distance between the respective polarizing strips of the polarizing filter or the white light strips is the same as that between the pixels of the image display element, and the number of the strips is the same as that of the parallel pixel lines of the image display element. The polarizing filter is illuminated by two spaced illuminating lights having the same polarization direction as that of the strips directly or through transparent optical elements such as Fresnel lens of holographic screen having a size substantially equal to that of the image display element. In case of directly illuminating the polarizing filter, as in case of the white light strip, transparent optical elements such as Fresnel lens of holographic screen having a size substantially equal to that of the image display element must be overlapped at the front of the image display element. In case of using the white light strip, equally spaced illuminating lights, the number of which is the same as that of multiview images, are illuminated through a mask and a projection lens, wherein the mask is provided with equally spaced parallel rectangular openings having the same number as that of parallel pixel lines of the image display element divided by that of multiview images, so that the enlarged image of the mask is displayed on the image display element. In this case, the images of the openings on the mask must coincide with the corresponding pixel lines of the image display element.

BRIEF DESCRIPTION OF THE DRAWINGS

The aforementioned aspect and other features of the invention are explained in the following description, taken in conjunction with the accompanying drawings wherein.

DETAILED DESCRIPTION OF THE INVENTION

The present invention will be below explained in detail with reference to the accompanying drawings.

Figure 1:
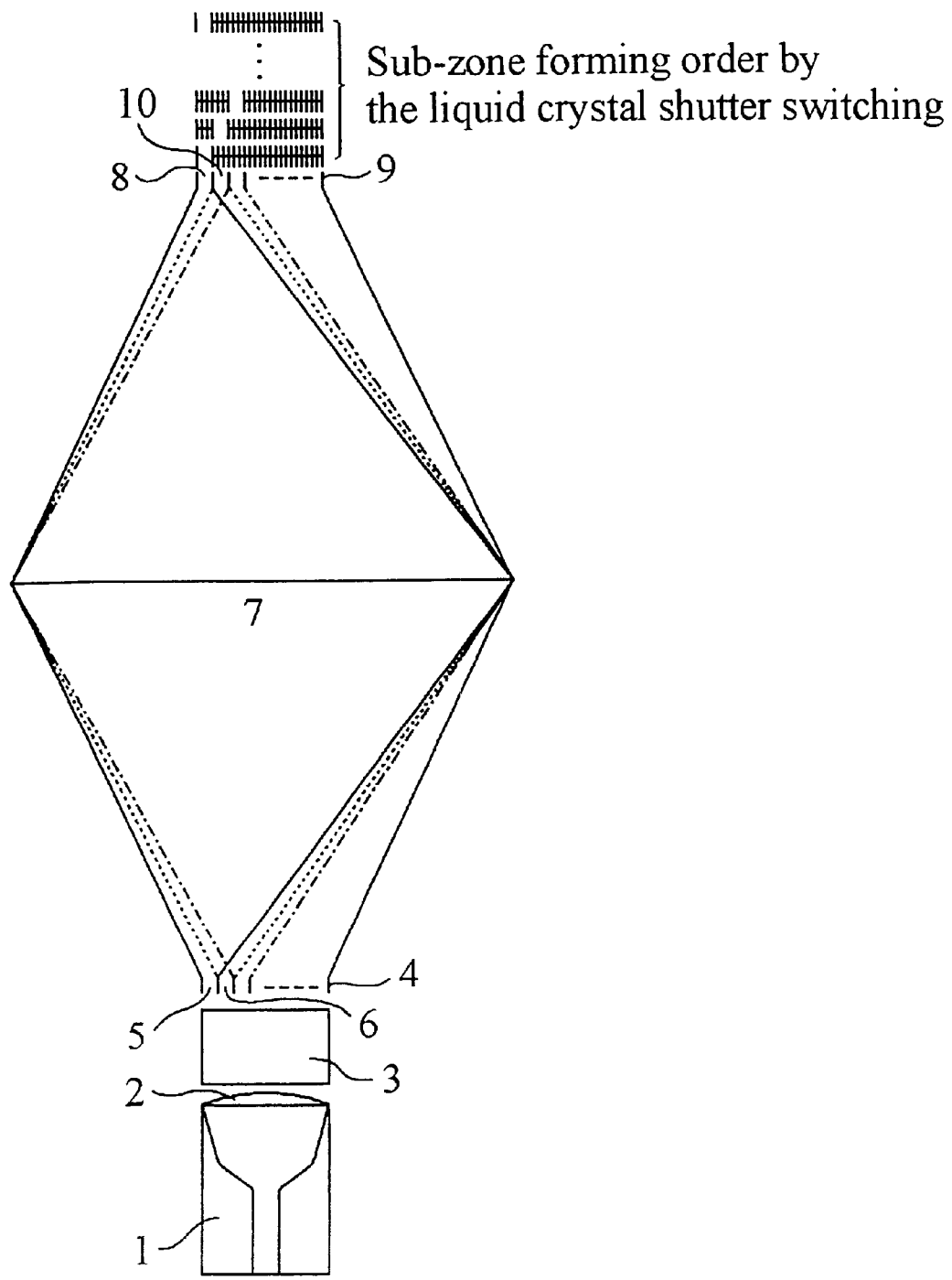
FIG. 1 is a schematic diagram for illustrating an operation principle of a conventional projection type multiview 3D image display device.

FIG. 1 is a schematic diagram for illustrating an operation principle of a conventional projection type multiview 3D image display device. In the conventional projection type multiview display device, since it must operates at the frame or field rate of at least 60×(number of multiview images) in order to eliminate the flickering of the display screen, it must use high speed image display elements such as a CRT, a DMD (Deformable Micromirror Device:) or an FLC (Ferroelectric Liquid Crystal). As shown in FIG. 1, an image on the display surface 2 of the image display element 1 is projected onto the screen 7 via both a projection lens 3 adjacent to the image display element 1 and a strip type LCD shutter 4 disposed at the front of the principal plane of the projection lens 3. The LCD shutter 4 has strip type LCD shutters 5 and 6 disposed in parallel, the number of which coincides with that of the multiview images. Each of the strip type shutters 5 and 6 is turned on/off in synchronization with the respective display order of the multiview images being displayed on the image display element 1. The ON period of the shutters 5 and 6 is equal to the period during which the corresponding multiview images are displayed on the image display element 1, and the shutters are at OFF state except for the ON period. For instance, when an image of any view point is displayed on the image display element 1, the corresponding strip type LCD shutter 5, e.g. the leftmost strip type LCD shutter 5 of the LCD shutter 4, is turned on for the display period of the image 2 on the display plane. The image 2 is projected onto the screen having the property of a lens or reflecting mirror through the LCD shutter 5. The screen 7 converges the images projected thereon onto an image forming area 8. The image forming area 9, which the image on the screen of the LCD shutter 4 is converged onto, is called a viewing zone, and the areas within the viewing zone, which the respective images of the strip type shutters is converged onto, are viewing sub-zones 8 and 10. The image of the LCD shutter 6 corresponds to the sub-zone 10.

Figure 2:
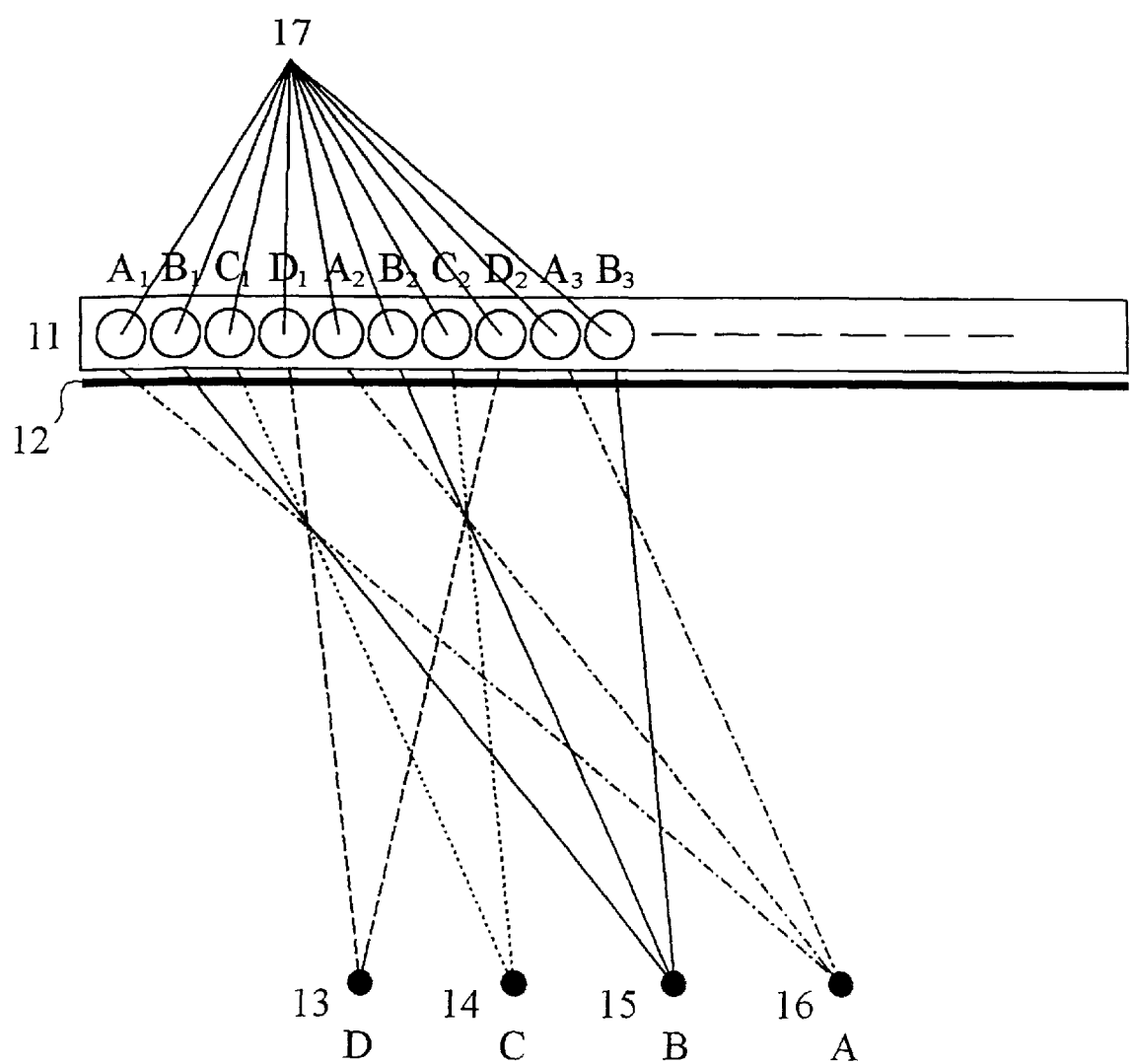
FIG. 2 is a schematic diagram for illustrating an operation principle of a conventional contact type multiview 3D image display device.

FIG. 2 is a schematic diagram for illustrating an operation principle of a conventional contact type multiview 3D image display device. In operation, the pixels 17 of the image display element 11 are divided by the number of multiview images and the multiview images are repeatedly displayed on the respective pixel lines. For example, in case of four point views A, B, C and D, the multiview images are displayed on the corresponding pixel lines of the image display element 11 in the order of $A_1, B_1, C_1, D_1, A_2, B_2, C_2, D_2, A_3, B_3, C_3, D_3, \ldots$, etc. An optical plate 12 such as a lenticular or a parallax barrier is placed at the front or rear end of the image display element. The optical plate 12 separates the respective multiview pixel lines and displays only the same multiview pixel lines at a position on the viewing zone. Thus, the respective viewing zones of the multiview images A, B, C and D is positioned by a certain forward distance from the image display element.

Figure 3A:
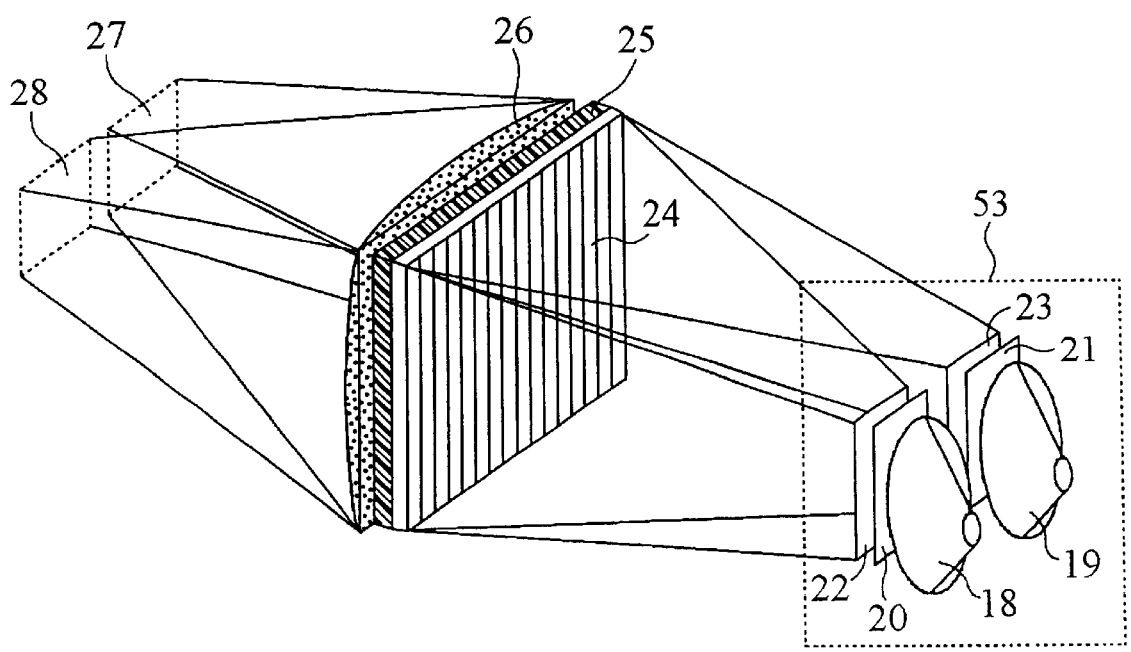
FIG. 3 is a schematic perspective diagram for illustrating an operation principle of a non-glasses type 3D image display device using polarization according to the present invention.
Figure 3B:
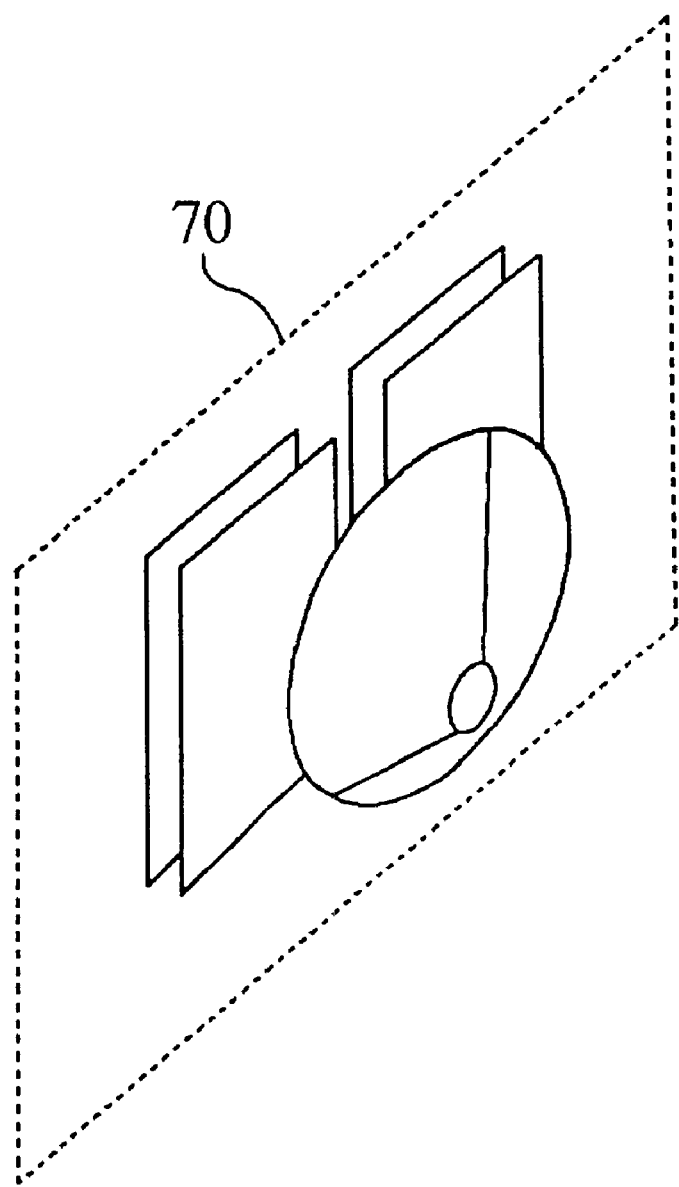

FIG. 3 is a schematic perspective diagram for illustrating an operation principle of a non-glasses type 3D image display device using polarization according to the present invention. Two adjacent light sources 18 and 19 are disposed in parallel with the image display element 25. The lights from the light sources 18 and 19 are illuminated through the polarizing plates and 21, the diffusers 22 and 23 and the polarizing filter 24 onto the image display element 25 where images corresponding to the left and right eyes of a person are alternately displayed on the respective column pixel lines, respectively. The polarizing plates 20 and 21 disposed in the front of the two light sources 18 and 19 have the polarizing directions different from each other by a 90 degrees. Thus, the lights from two light sources 18 and 19 through the polarizing plate 20 and 21 are respectively polarized in certain directions different from each other by a 90 degrees. For example, if the light through the polarizing plate 20 has a horizontal polarization, the light through the polarizing plate 21 has a vertical polarization. The respective light sources, polarizing plates and diffusers constitutes an illuminator 53 for illuminating the image display element. As shown by numeral reference 70 in FIG. 3, a single light source may be used instead of the two light sources 18 and 19.

The polarizing filter 24 is arranged such that the lights having different polarizing directions can be illuminated onto only the pixel lines on the image display element 25 corresponding to the left or right eye, respectively. That is, the light having one polarizing direction is illuminated onto only the pixel lines corresponding to the left (or right) eye and the light having the other polarizing direction is illuminated onto only the pixel lines corresponding to the right (or left) eye. A lens 26 positioned in the front of the image display element 25 or in the rear of the polarizing filter 24 converges the respective polarized lights transmitted through the image display element 25, so that images 27 and 28 of the polarizing plates 20 and 21 is formed in the front of the image display element. The regions where the images 27 and 28 are formed are the viewing zones. The polarized lights having polarizing directions different from each other by 90 degrees are converged onto the corresponding viewing zones that penetrate the pixel lines corresponding to the left or right eye. It the image corresponding to the left eye may be viewed on the viewing zone corresponding to the image 27, the image corresponding to the right eye may be viewed on the viewing zone corresponding to the image 28. Thus, it is possible to view stereoscopic images.

Figure 4A:
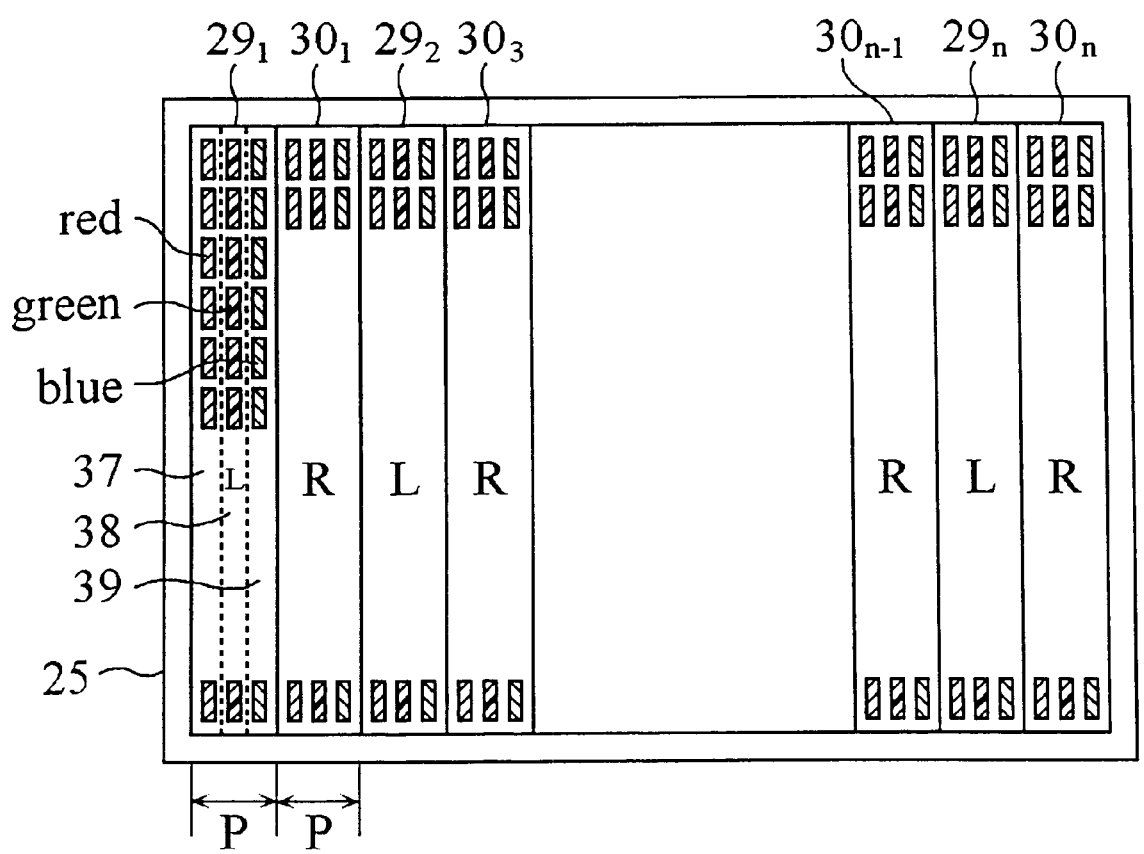
FIG. 4a is a color pixel structure of the image display device.
Figure 4B:
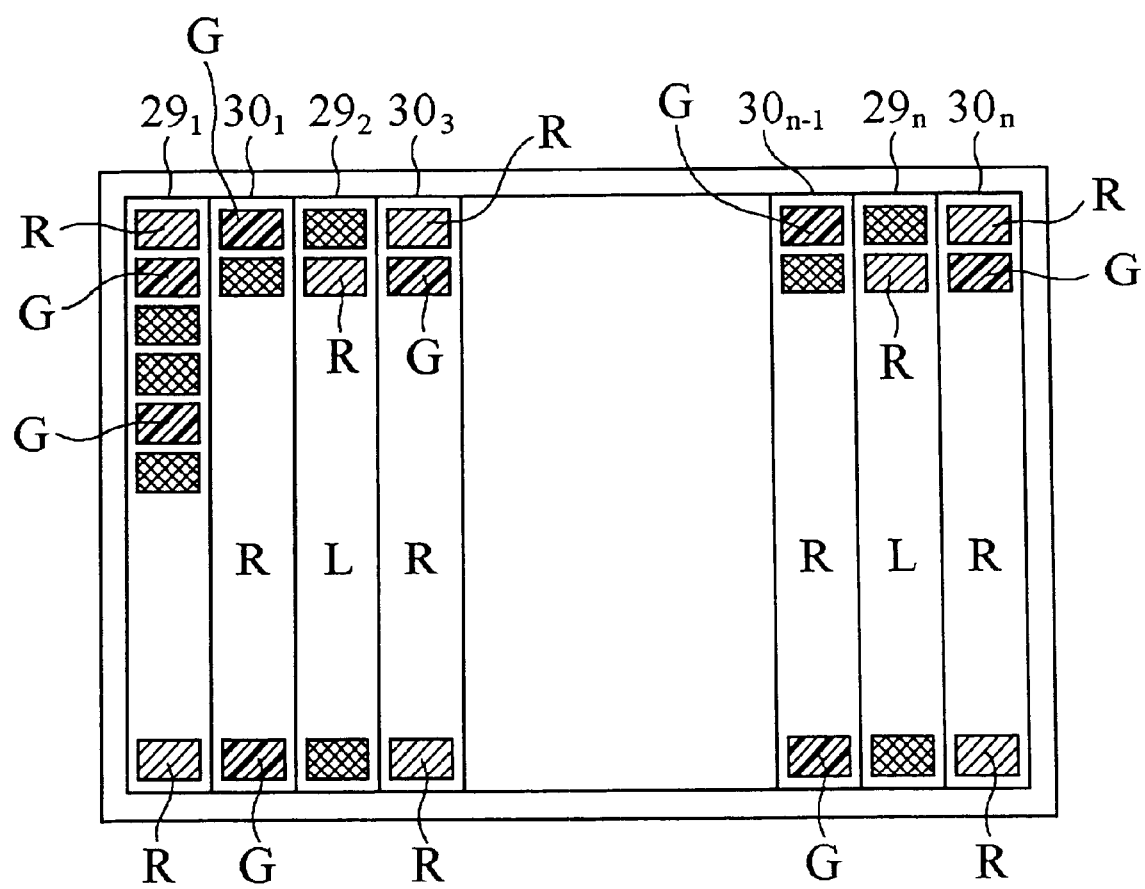
FIG. 4b is a monochrome pixel structure of the image display device.
Figure 4C:
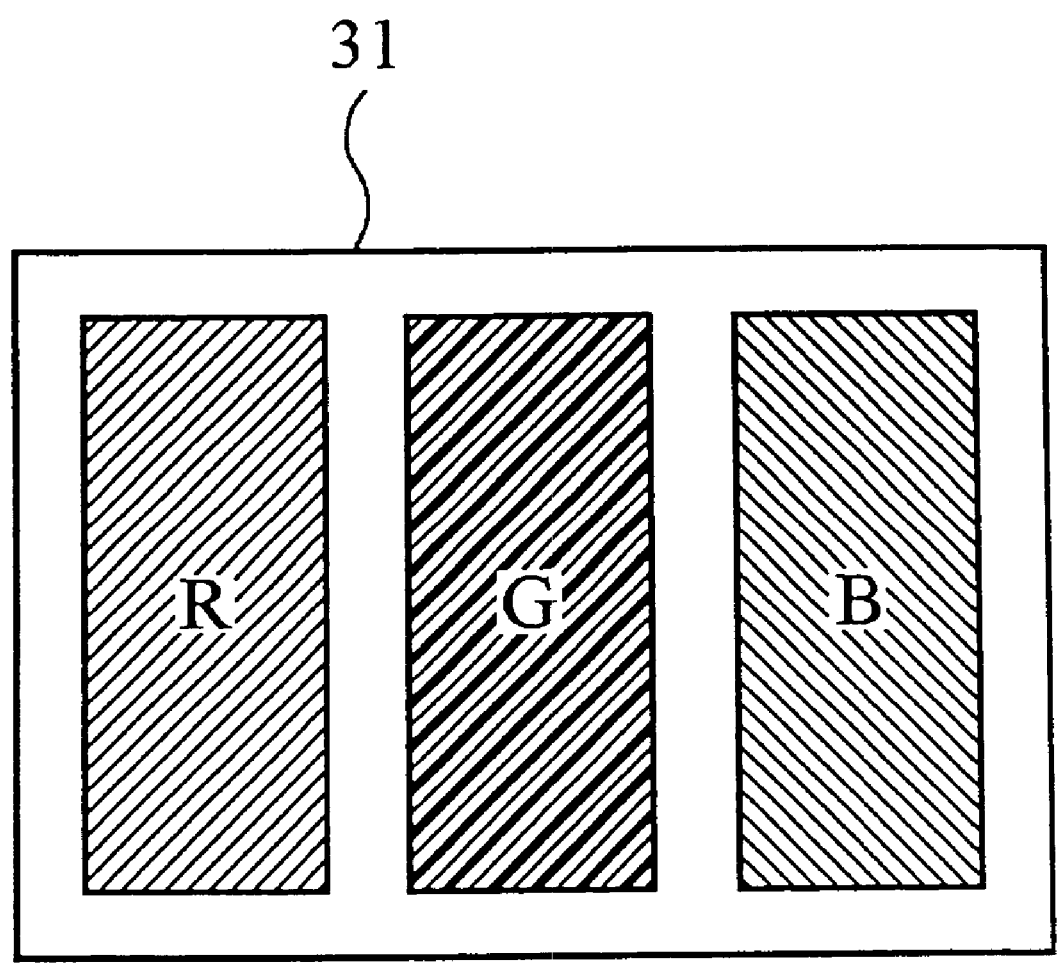
FIG. 4c is the structure of one pixel of the color pixel structure.

FIG. 4a is a color pixel structure of the image display device, FIG. 4b is a monochrome pixel structure of the image display device, and FIG. 4c is the structure of one pixel of the color pixel structure. On the image display element 25 are alternatively displayed the images $29_1$–$29_n$ corresponding to the left eye and the images $30_1$–$30_n$ corresponding to the right eye in the column pixel lines $29_1$, $30_1$, $29_2$, ..., $30_{n-1}$, $29_n$, $30_n$. In case of color pixels, a pixel in the respective pixel line consists of three color pixel of red, green and blue and thus, all pixels consist of three color pixels of red, green and blue in order. Thus, the respective pixel line consists of a strip of three color of red 37, green 38 and blue 39. In case of monochrome pixels, the pixel has one of the three color. Pixels having respective colors, which is red, green and blue in order, other than that of the monochrome pixel are arranged around the pixel.

Figure 5A:
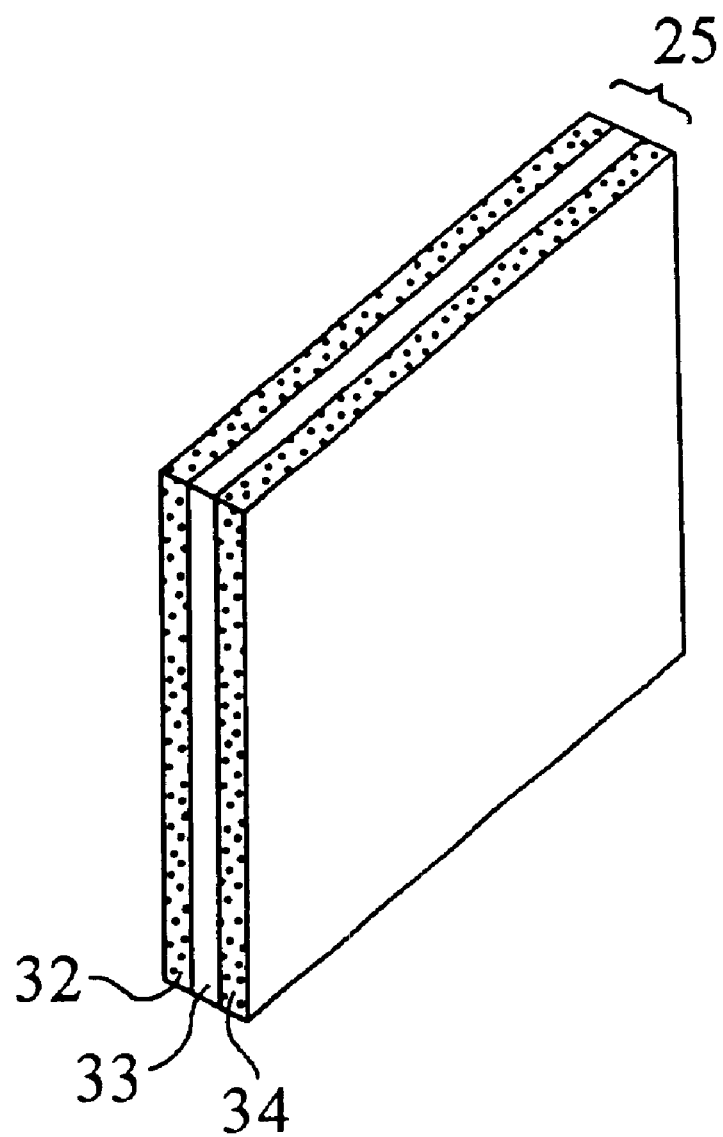
FIG. 5a is a structure of an image display element using liquid crystal.
Figure 5B:
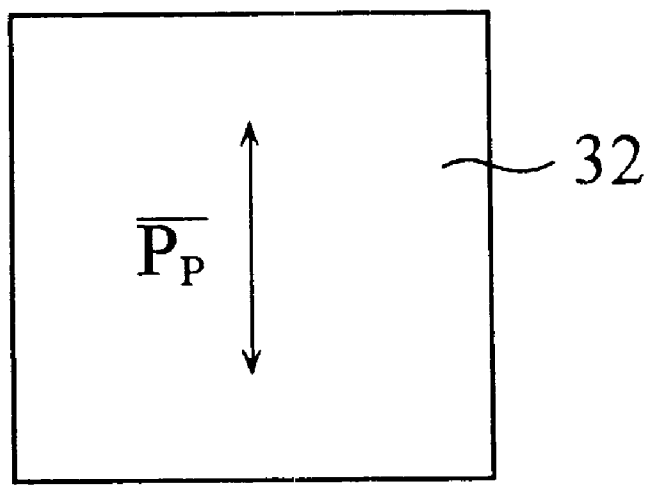
FIG. 5b shows respective polarizing directions of layers constituting the image display element.
Figure 5B:
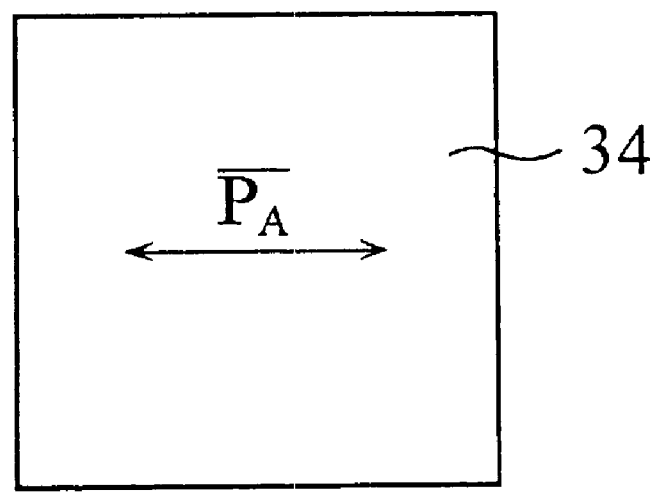

FIG. 5a is a structure of an image display element using liquid crystal, and FIG. 5b shows respective polarizing directions of layers constituting the image display element. The image display element 25 using liquid crystal has three-layer structure of a polarizer 32, a liquid crystal layer 33 and an analyzer 34 in order from the incident direction of light. The polarizer 32 transmits therethrough one of polarization components of the incident light, e.g. a vertical polarization component in FIG. 5, into the liquid crystal layer 33. The analyzer 34 having a polarizing direction different from that of the polarizing plate 32 by 90 degrees transmits therethrough the component of the incident light transmitted through the liquid crystal layer 33 and rotated in the polarizing direction by the respective pixel voltage applied to the liquid crystal layer 33. The polarizing filter may be a strip type dichroic polarizer, a strip type phase retardation device or an achromatic phase retardation device.

Figure 6A:
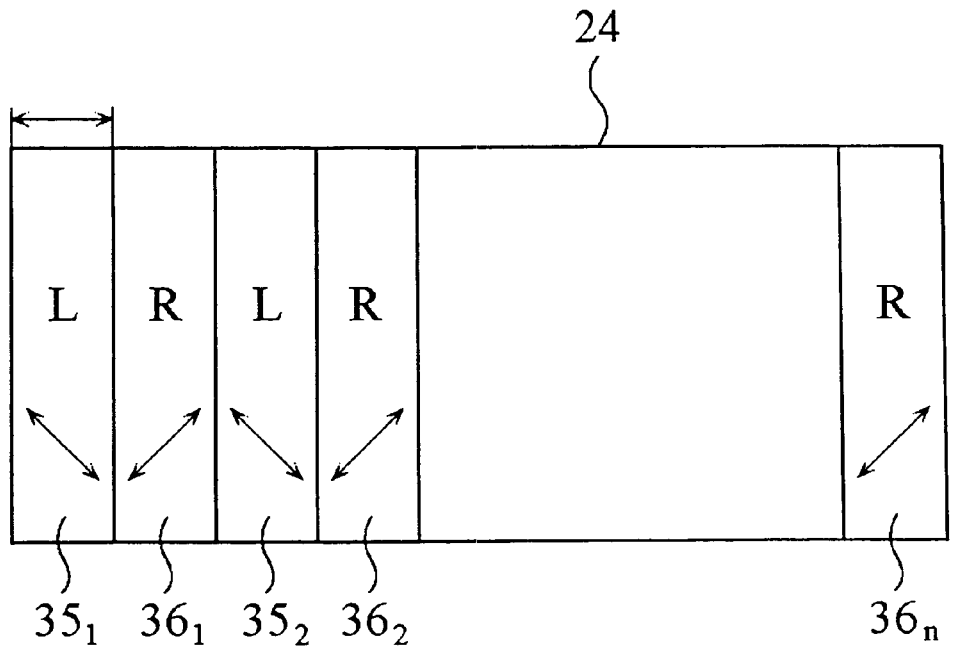
FIG. 6a shows a structure of a polarizing filter using a dichroic polarizer.
Figure 6B:
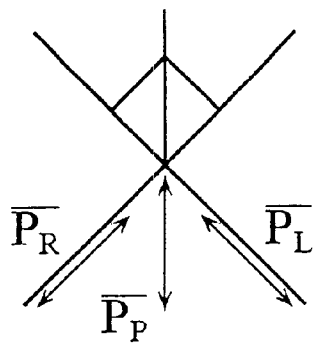
FIG. 6b shows a polarizing direction of the polarizing filter.

FIG. 6a shows a structure of a polarizing filter using a dichroic polarizer, and FIG. 6h shows a polarizing direction of the polarizing filter. The polarizing filter 24 is formed by alternately arranging the strip type dichroic polarizers $36_1$–$36_n$ and $35_1$–$35_n$ respectively having the polarizing directions different from that of the polarizing plate of the image display element by +45 degrees and −45 degrees where the number of the dichroic polarizers is equal to that of the pixel lines of the image display element. The width of the respective strip type polarizers and the distance between them are set such that lights penetrating the respective strip type polarizers is illuminated onto the corresponding pixel lines of the image display element, respectively. The length of the respective strip type polarizers is equal to the height of the polarizing plate. If the polarizing direction of the polarizing plate of the image display element is 90 degrees, that of the strip type polarizer is 45 degrees or 135 degrees. The polarizing filter has a simple structure, but has a problem that 75% of the energy of the incident light is lost by the polarizing filter and the polarizing plate of the image display element.

Figure 7:
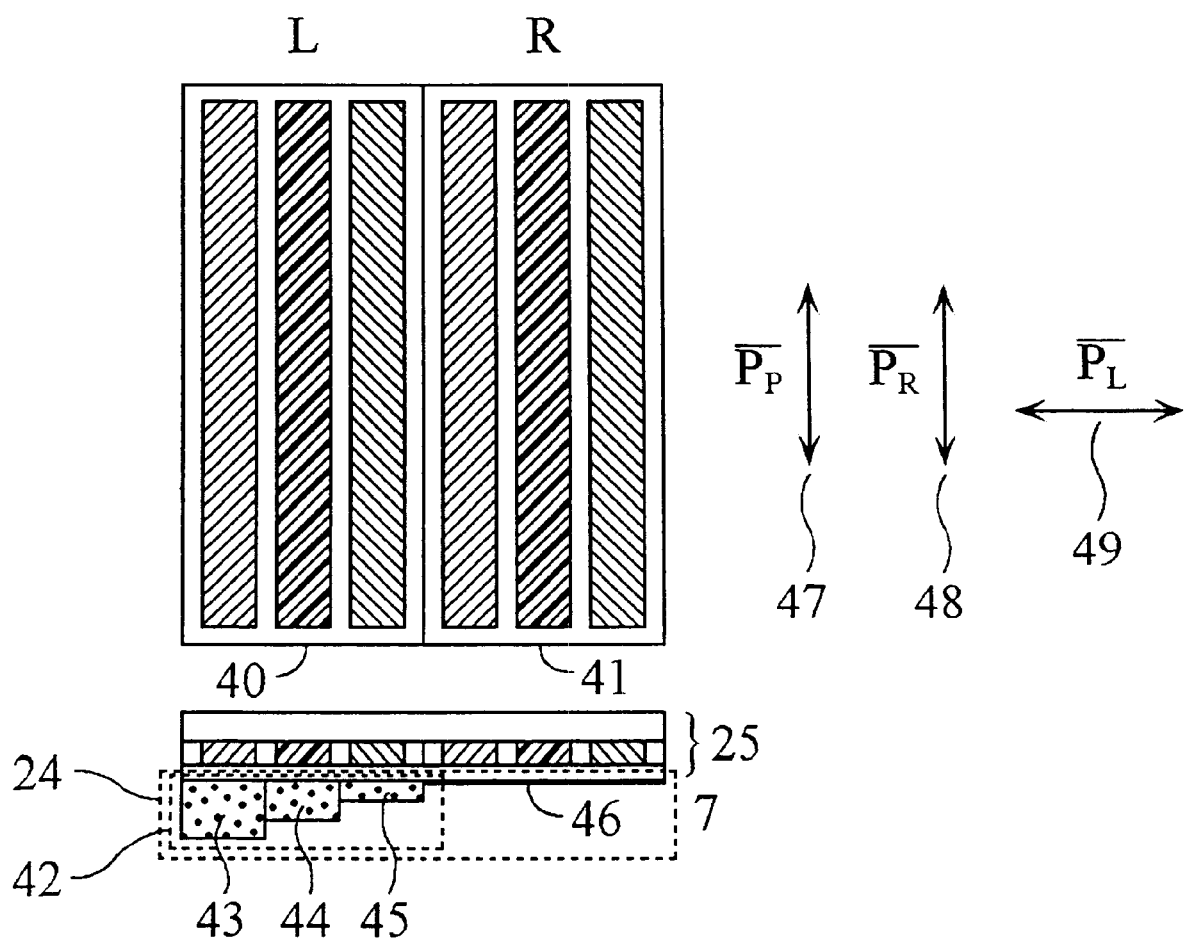
FIG. 7 is a schematic structural diagram of a polarizing filter using a phase retardation element.

FIG. 7 is a schematic structural diagram of a polarizing filter using a phase retardation element. The polarizing filter 24 comprises a phase retardation device 42 for retarding by a half wavelength the phase of the light incident onto the pixel lines 40 of one of the images corresponding to the left or right eyes and transmitting without phase retardation the light incident onto the pixel lines 41 of the other of the images corresponding to the left or right eyes. The phase retardation element 42 is made from birefringent material and has a fast axis inclined by +45 or −45 degrees with respect to the polarizing direction of the polarizing layer of the image display element such as an LCD. The thickness of the phase retardation element 42 decreases in the order of the red color half-wavelength phase retardation element 43, the green color half-wavelength phase retardation element 44 and the blue color half-wavelength phase retardation element 45 so as to retard the respective color pixels of the pixel lines by a half-wavelength, and the portion of the polarizing filter 46 corresponding to the pixel line 41 is the transparent plate portion without any phase retardation. In case of using the phase retardation element type polarizing filter described above, one direction of the incident beam must be parallel to the polarizing direction 48 of the polarizing plate of the image display element and the other direction of the incident beam must be a direction 49 vertical to the polarizing direction 48.

Figure 8:
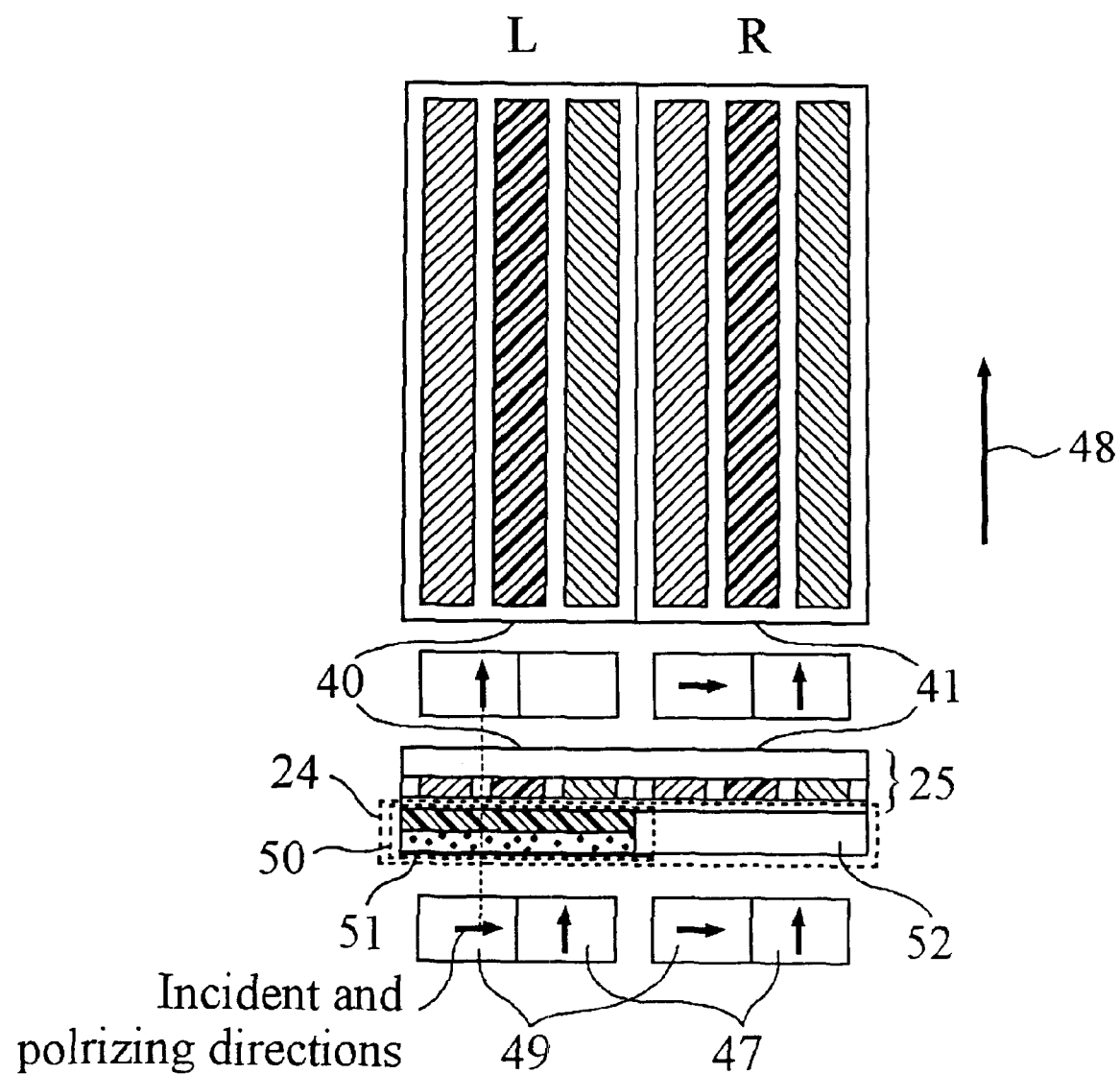
FIG. 8 is a schematic structural diagram of a polarizing filter using achromatic phase retardation element.

FIG. 8 is a schematic structural diagram of a polarizing filter using achromatic phase retardation element. As in the polarizing filter of FIG. 7, the polarizing filter 24 comprises a achromatic phase retardation device 50 for retarding by a half wavelength the phase of the light incident onto the pixel lines 40 of one of the images corresponding to the left or right eyes and transmitting without phase retardation the light incident onto the pixel lines 41 of the other of the images corresponding to the left or right eyes. The achromatic phase retardation device 50 uses a quarter-wavelength phase retardation plate 51 and a polarization compensator disposed below the phase retardation plate 51 and capable of compensating for the difference between the wavelengths delayed by the phase retardation plate 51 to rotate the polarizing directions of the overall visible lights by 90 degrees, or to prevent the lights having the same direction 47 as the polarizing direction 48 of the polarizing plate of the phase retardation device from passing therethrough, and to rotate by 90 degrees and transmit therethrough the light having the polarizing direction vertical to the polarizing direction 48. The light rotated by 90 degrees is transmitted through the polarizing plate so that the polarizing direction of the light becomes equal to the polarizing direction of the polarizing plate of the phase retardation device or different therefrom by 180 degrees. The portion 52 of the polarizing filter 24 corresponding to the pixel line transmits the light without any phase retardation.

Figure 9:
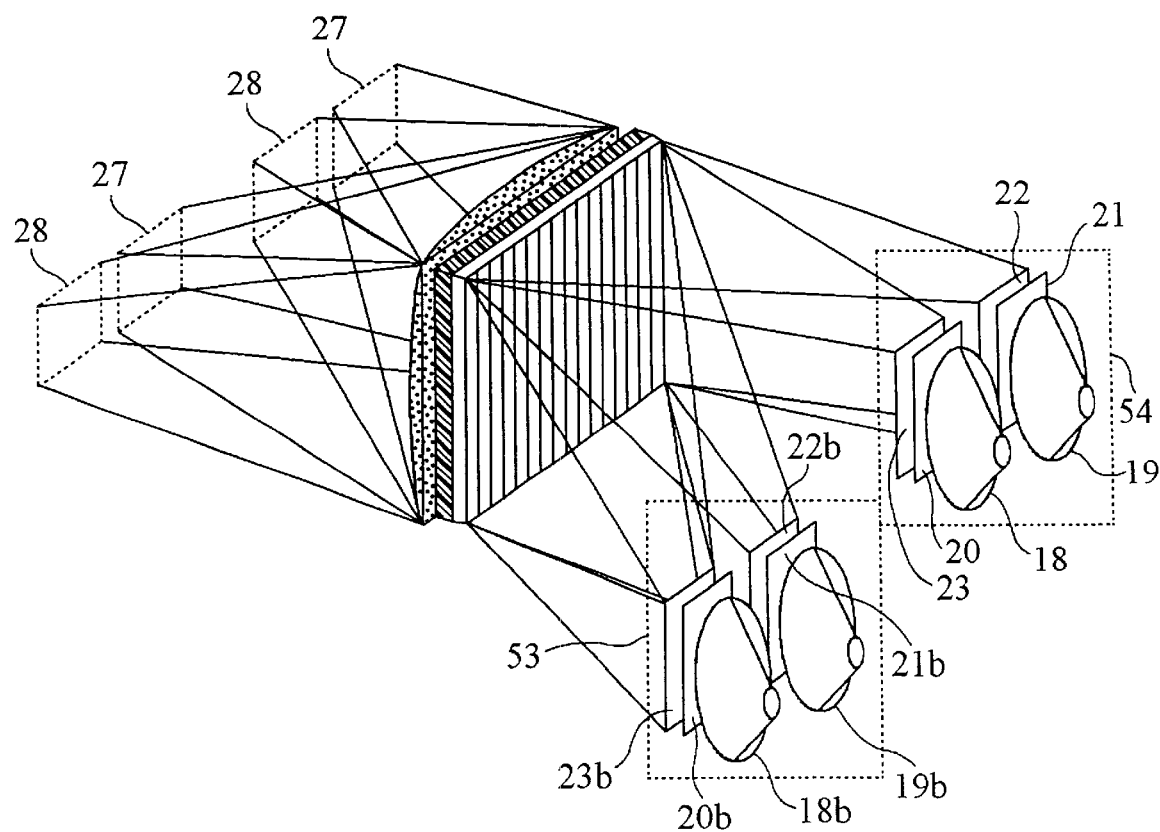
FIG. 9 is a schematic perspective diagram of 3D image display device using a polarizing filter for two users' simultaneous viewing.

FIG. 9 is a schematic perspective diagram of 3D image display device according to the present invention, using a polarizing filter for two users' simultaneous viewing. The 3D image display device in FIG. 9 has the same structure as that of the 3D image display device except that the device in FIG. 9 uses an illuminating device 54 comprising a plurality of light sources 18, 18a, 19 and 19b. The position and size of viewing zones 27 and 28 are varied depending on the relative position of the illuminating device 54.

Figure 10A:
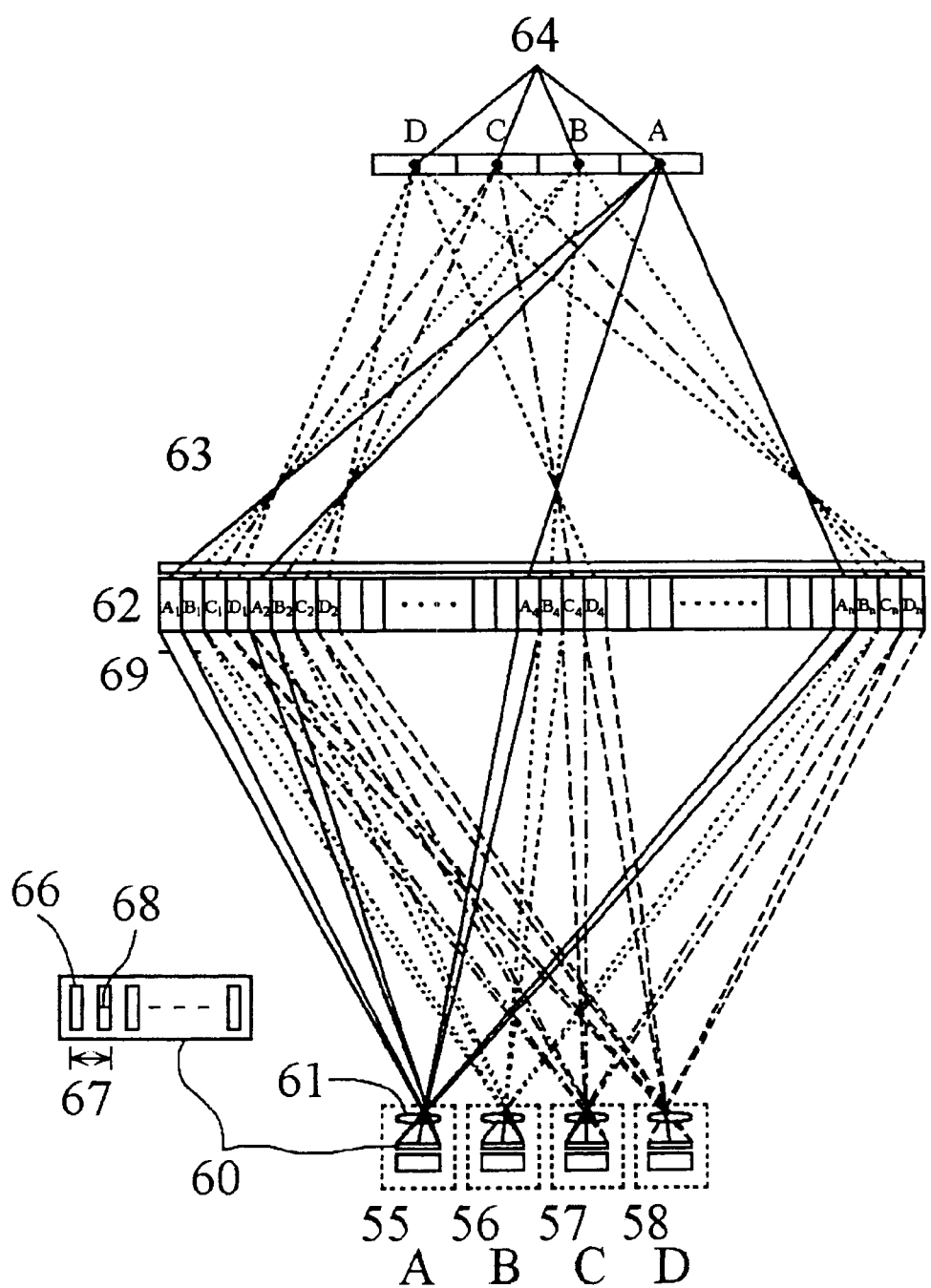
FIG. 10a is a plan view of an optical system of an four viewpoint image display system using white light strips according to the present invention.
Figure 10B:
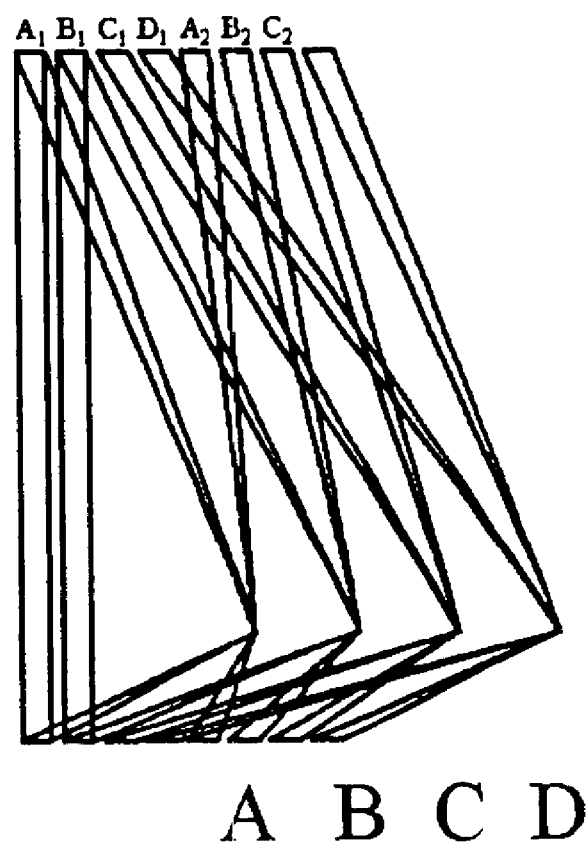
FIG. 10b is a side view thereof.

FIG. 10a is a plan view of an optical system of an four viewpoint image display system using white light strips according to the present invention, and FIG. 10b shows the white light strips in detail. As shown in FIG. 2, in case of four viewpoint images, the multiview images are displayed on the corresponding pixel lines of the image display element 11 in the order of $A_1$, $B_1$, $C_1$, $D_1$, $A_2$, $B_2$, $C_2$, $D_2$, $A_3$, $B_3$, $C_3$, $D_3$, ..., $D_n$, that is, the first pixel line of the A image, the first pixel line of the B image, the first pixel line of the C image, the first pixel line of the D image, the second pixel line of the A image, the second pixel line of the B image, the second pixel line of the C image, the second pixel line of the D image, ..., the last nth pixel line of the D image. In order to display the four viewpoint images, the respective viewpoint images must be simultaneously illuminated by the respective light sources. The respective viewpoint pixel lines are illuminated by the respective viewpoint white light strip array projector 55, 56, 57 and 58, each of which consists of a white light source 59, a mask 60, in which rectangular slits 66 are equidistantly disposed, and a projection lens 61. The number of the slits 66 in the mask 60 is equal to the total number of the pixel lines of the image display element 62 divided by the number of the multiview images, the width of the slits 66 is equal to the width 69 of the pixel lines of the image display element 62 divided by the magnifying power m of the projection lens, and the distance 67 between the slits 66 is equal to the width of the pixel line multiplied by the number of the multiview images divided by the magnifying power m. The respective masks 60 of the projectors are disposed so that they can exactly illuminate only the respective pixel lines corresponding to the images 65 of the slits of the mask 60. The images 64 of the projection lenses 61 of the projectors are formed by an optical element such as a Fresnel lens and the like disposed at the front of the image display element 62. The respective projectors are not overlapped with each other but adjacently spacedly disposed by less than the eye distance of a person.

According to the present invention, by selectively illuminating the pixel lines corresponding to the image display element, it is possible to display stereoscopic and multiview images and to provide the image display apparatus which a plurality of users can view multiview 3D images.

The present invention has been described with reference to a particular embodiment in connection with a particular application. Those having ordinary skill in the art and access to the teachings of the present invention will recognize additional modifications and applications within the scope of the present invention. It is therefore intended by the appended claims to cover any and all such applications, modifications, and embodiments within the scope of the present invention.

What is claimed is:

1. A multiview image display system, comprising:
    an image display element for alternately displaying respective multiview images corresponding to the respective left and right eyes of one person on column pixel lines thereon;
    a white light strip generator disposed at the rear of the image display element for generating white light strips corresponding to the respective multiview images; and
    means disposed between the image display element and the white light strip generator for separating the multiview images into respective viewpoint images,
    wherein the white light strip generator generates evenly spaced white light strips of the same number as that of the multiview images, and
    the white light strip generator comprises:
        a white light source;
        a mask having rectangular slits of the same number as that of the column pixel lines of the image display element divided by that of the multiview images; and
        a projection lens.

2. The multiview image display system according to claim 1, wherein the number of the white light strips is equal to that of the pixel lines of the image display element, the respective white light strips illuminates the corresponding pixel lines displaying the corresponding multiview images.

3. The multiview image display system according to claim 1, wherein the width and length of the white light strips are equal to those of the pixel lines of the image display element.

4. The multiview image display system according to claim 2, wherein the width and length of the white light strips are equal to those of the pixel lines of the image display element.

5. A multiview image display system, comprising:
    an image display element configured to alternately display respective multiview images corresponding to the respective left and right eyes of one person on column pixel lines thereon;
    a white light strip generator disposed at the rear of the image display element configured to generate white light strips corresponding to the respective multiview images; and
    a lens disposed between the image display element and the white light strip generator configured to separate the multiview images into respective viewpoint images,
    wherein the white light strip generator generates evenly spaced white light strips of the same number as that of the multiview images, and
    the white light strip generator comprises:
        a white light source;
        a mask having rectangular slits of the same number as that of the column pixel lines of the image display element divided by that of the multiview images; and
        a projection lens.

6. The multiview image display system according to claim 5, wherein the number of the white light strips is equal to that of the pixel lines of the image display element, the respective white light strips illuminates the corresponding pixel lines displaying the corresponding multiview images.

7. The multiview image display system according to claim 5, wherein the width and length of the white light strips are equal to those of the pixel lines of the image display element.

8. The multiview image display system according to claim 6, wherein the width and length of the white light strips are equal to those of the pixel lines of the image display element.

* * * * *

UNITED STATES PATENT AND TRADEMARK OFFICE
CERTIFICATE OF CORRECTION

PATENT NO. : 6,603,504 B1 Page 1 of 1
DATED : August 5, 2003
INVENTOR(S) : Son et al.

It is certified that error appears in the above-identified patent and that said Letters Patent is hereby corrected as shown below:

<u>Title page,</u>
Item [30], should read:
-- [30]     Foreign Application Priority Data
    May 25, 1998   (KR) ......................... 1998-18773 --

Signed and Sealed this

Eleventh Day of May, 2004

JON W. DUDAS
*Acting Director of the United States Patent and Trademark Office*